Oct. 7, 1947.    G. PARRY    2,428,381
SCUPPER CONNECTION
Filed March 21, 1945    3 Sheets-Sheet 2

Inventor
GEORGE PARRY
By Ralph L. Chappell
Attorney

Oct. 7, 1947.    G. PARRY    2,428,381
SCUPPER CONNECTION
Filed March 21, 1945    3 Sheets-Sheet 3

Inventor
GEORGE PARRY
By Ralph L. Chappell
Attorney

Patented Oct. 7, 1947

2,428,381

UNITED STATES PATENT OFFICE 2,428,381

SCUPPER CONNECTION

George Parry, United States Navy

Application March 21, 1945, Serial No. 584,028

7 Claims. (Cl. 285—29)

(Granted under the act of March 3, 1883, as amended April 30, 1928; 370 O. G. 757)

The present invention relates to a scupper connection and more particularly to a scupper connection having means for engaging the interior of the scupper to retain the connection in place.

An object of the invention is to provide a scupper connection which is designed to eliminate the necessity of providing shoring or of welding clips to the hull as conventionally used for holding conventional hoppers in place on the sanitary and drainage lines of ships while in dry dock.

Another object is the provision of a scupper connection which is adapted to be quickly and easily installed on the hull at any angle in overboard discharge.

Other objects and advantages of the invention will be more apparent from the following description taken in connection with the accompanying drawings showing one embodiment of the invention, and in which.

Figure 1:
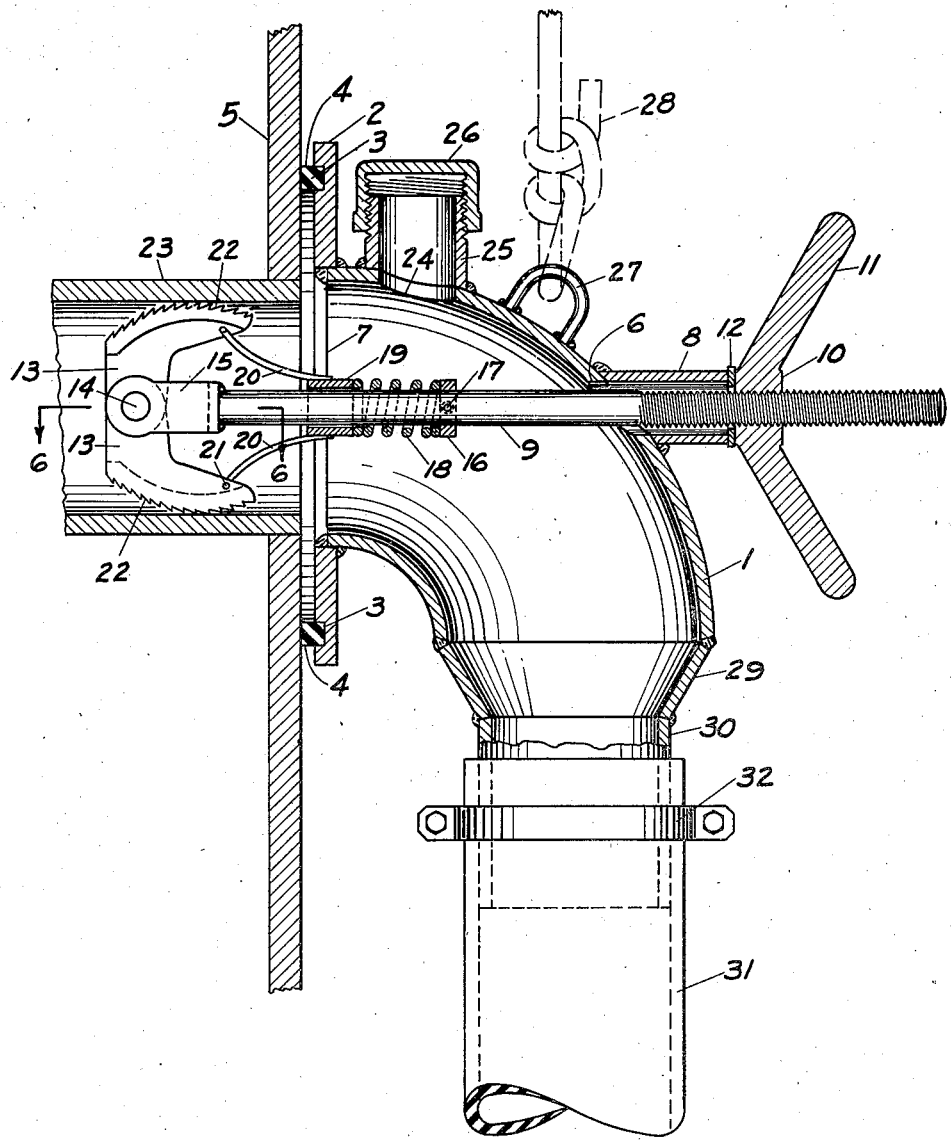
Fig. 1 is an elevation partly in section of a scupper connection or hopper member secured in place in the drainage scupper of a vessel, with drainage hose applied to the scupper connector.

In the drawings, the numeral 1 represents the curved tubular body of the scupper connector or hopper having a flange 2 provided with an annular recess 3 receiving a sealing ring 4, desirably of rubber, for engagement with the ship plate or hull 5. The connector 1 may desirably comprise a substantially 90° L pipe.

The scupper connector or hopper member 1 has an opening 6 through its wall substantially concentric or co-axial with the laterally facing inlet opening 7 of the connector. A tubular nipple 8 is provided on the connector 1, also in co-axial alignment with the openings 6 and 7. The outer end of the nipple 8 is in a plane substantially parallel to the plane of the laterally facing opening 7 and flange 2.

Extending through the aligned openings 6 and 7, is a rod 9 threaded at its outer end and receiving a take-up nut 10 having handles or arms 11 and adapted to take-up against the outer end of the tubular nipple 8, preferably with a washer 12 disposed therebetween.

The rod 9 is of sufficient length to extend at either end substantially beyond the device.

A pair of oppositely disposed jaw members 13 are pivotally mounted on a pin 14 carried by a yoke member 15 on the inner end of the rod 9. The pin 14 may desirably be riveted, as indicated. Means are provided according to the invention which urge the pivoted jaws 13 towards the position shown in Fig. 2, and comprise a collar 16 adjustably fixed to the shaft or rod 9 by a set screw 17 or other suitable means, a coil spring 18 surrounding said rod and engaging at one end with the fixed collar 16 and engaging at its other end with a collar 19 slidable on the rod 9. Secured to the slidable collar 19, in any suitable way, as by brazing, are the ends of a pair of connecting members 20 desirably of spring metal, the opposite ends of which are turned laterally and are pivotally received in openings 21 in the jaws 13. The spring or spreader members 20 may desirably be of Phosphor bronze.

The pivoted jaw members 13 provide segmental arcuate cam surfaces 22 which are preferably serrated or toothed as indicated, to frictionally engage the inner surface of the scupper 23 of the ship. The teeth may desirably be case hardened.

An opening 24 is preferably provided in the upper portion of the scupper connector 1, with a pipe nipple 25 and a screw cap 26. This provides for ready access to the interior of the connector for manipulation, adjustment, or cleaning.

A hasp 27 may desirably be provided on the device to which a rope 28 may be attached for hoisting and securing purposes when desired.

The connector preferably comprises a hopper portion 29, and a terminal nipple portion 30 to which the hose 31, or other conducting means, is secured by a suitable securing means such as clamp 32.

As indicated in the drawing, various parts may desirably be connected together by welding which contributes to ease of assembly of the device.

Figure 2:
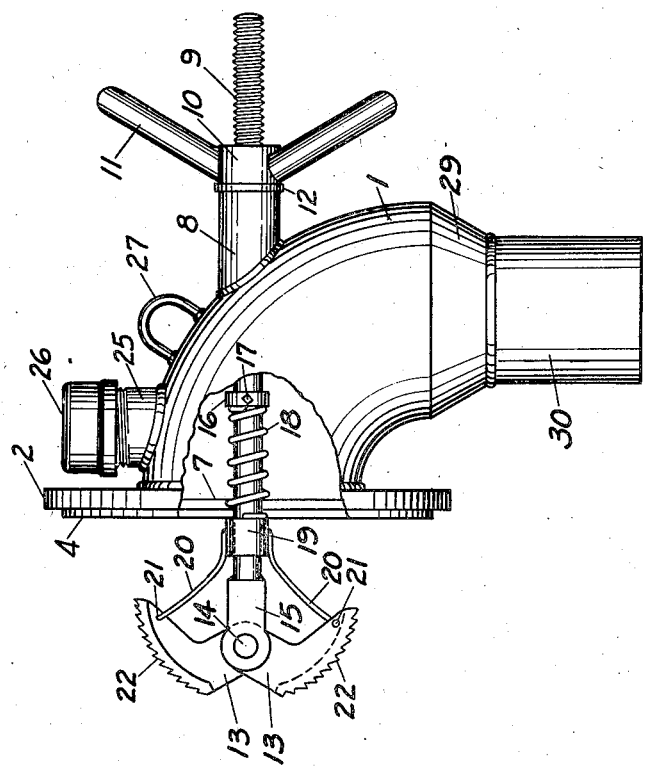
Fig. 2 is a side elevation, partly broken away, showing the scupper connector of the present invention in its condition when not attached to the scupper.
Figure 4:
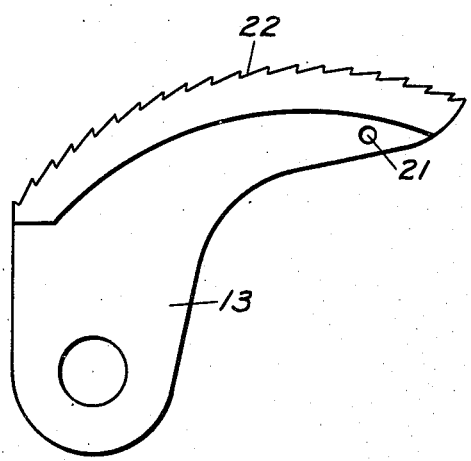
Figs. 4 and 5 are side and edge elevations of one of the jaw members of the device.
Figure 5:
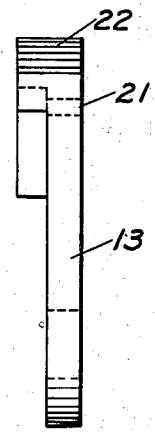
Figure 6:
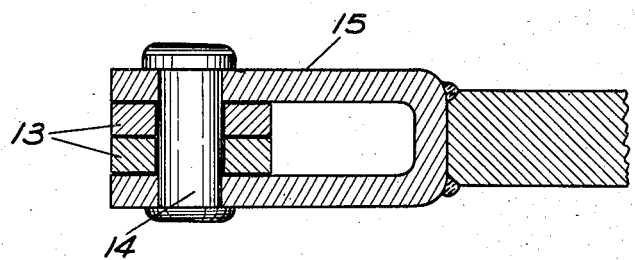
Fig. 6 is a horizontal sectional view of the yoke and pin mounting for the jaw members, substantially on the line 6—6 of Fig. 1.

The jaws 13 are so designed, in respect to the diameter of the scupper 23 of the vessel, that in the position shown in Fig. 2, the distance between the outer extremities of the jaws is substantially greater than the diameter of the scupper.

Figure 3:
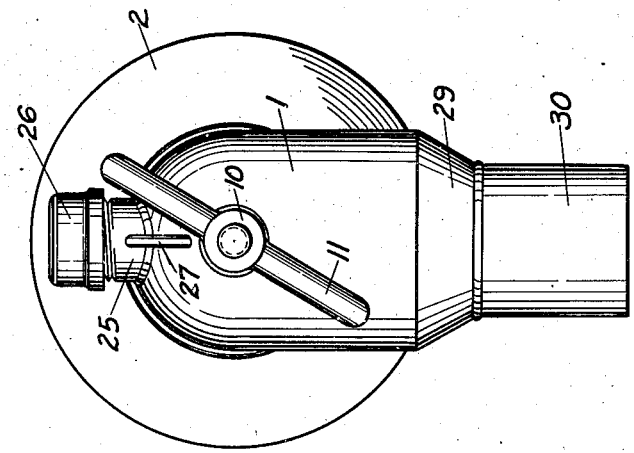
Fig. 3 is a rear elevation of the scupper connection of Fig. 2.

In operation, the device may desirably be first assembled as indicated in Figs. 2 and 3, with the nut 10 suitably adjusted, and is then applied to the scupper 23 of the ship, by inserting the end of the rod, carrying the pivoted jaws 13, into the scupper opening thereby forcing the pivoted jaws to swing inwardly toward the rod 9 as they enter the scupper 23, and to assume the position indicated in Fig. 1, against the action of the spring means 18 and 20.

The connection is then made secure by taking up on the nut 10, which tends to retract the rod 9 thereby accomplishing a binding or clamping action of the jaws 13 against the scupper walls, and securely retaining the connector in place with the sealing ring 4 of the flange 3 of the connector in firm engagement with the ship plate 5.

To release the device, the nut 10 is retracted and withdrawal of the jaws and rod from the scupper is effected. The operating nut 10 may be removed from the rod 9, if desired, and the connector 1 may be removed from the rod, and the jaws and rod are then removed from the scupper. If necessary, the spring 18 may be further compressed by manual retraction of the collar 19 or the spring itself, in releasing the jaws from the scupper.

Alternatively, the operating handle nut 10 may be retracted without removal from the rod, and access to the interior of the device for manual retraction of the collar 19 or the spring 18 may be had by means of a pry rod or the like inserted through the nipple 25, or inserted between the ship plate 5 and the flange 2 by retraction of the connector 1.

The hose 31 may be connected to the device before or after the connection with the scupper is made, as may be desired. The hasp 27 is useful for raising and lowering and supporting purposes by attachment of a rope 28 or the like.

The device of the present invention provides an effective scupper connection, eliminating the need for shoring of scupper hoppers or drainage boxes from dockside, which interferes with cranes and painter's staging and eliminating the necessity and danger of welding clips to the hull where shores cannot be used.

Although but one embodiment of the invention is herein shown and described, it will be understood that various changes in the size, shape, and arrangement of parts may be made without departing from the spirit of the invention and it is not intended to limit the invention other than by the terms of the appended claims.

The invention described herein may be manufactured and used by or for the Government of the United States of America for governmental purposes without the payment of any royalties thereon or therefor.

What is claimed is:

1. In combination in a scupper connector, a hopper having an inlet opening for alignment with the scupper of a vessel and having a discharge opening, an opening in the wall of said hopper in co-axial alignment with the said inlet opening, a tubular nipple on said hopper in registry with said co-axial opening, a rod disposed in said aligned openings and nipple and extending outwardly of said hopper at both ends of the rod, a hand nut threaded on the end of the rod which extends beyond the tubular nipple and disposed to be taken up against the end of the nipple, and means on the end of the rod which extends beyond the inlet opening of the hopper to be received within the scupper of the vessel, said means comprising jaw means pivoted to the end of the rod and disposed laterally of said rod, a member slidable on said rod in rear of said pivotal mounting of the jaw means, spreader means connected between the slidable member and the pivoted jaw means, a member fixed on said rod, and a coil spring disposed between said fixed and slidable members on said rod.

2. In combination in a scupper connector, a hopper having an inlet opening for alignment with the scupper of a vessel and having a discharge opening, an opening in the wall of said hopper in co-axial alignment with the said inlet opening, a tubular nipple on said hopper in registry with said co-axial opening, a rod disposed in said aligned openings and nipple and extending outwardly of said hopper at both ends of the rod, a hand nut threaded on the end of the rod which extends beyond the tubular nipple and disposed to be taken up against the end of the nipple, and means on the end of the rod which extends beyond the inlet opening of the hopper to be received within the scupper of the vessel, said means comprising a yoke on the end of the rod, a pair of jaws pivoted to the yoke by a pin and extending laterally of the rod on opposite sides of the rod, said jaws comprising arcuate segmental cam surfaces having teeth thereon, the outer ends of said jaws being disposed in rear of said pivot, a collar slidable on said rod in rear of said pivot, a pair of spreader members connected between the slidable collar and the pivoted jaws, a collar adjustably fixed on said rod by means of a set screw, and a coil spring disposed between said fixed and slidable members on said rod.

3. In combination in a scupper connector a hopper comprising a substantially 90° L pipe having an inlet opening for alignment with the scupper of a vessel and having a discharge opening for connection with a discharge hose, a flange surrounding said inlet opening and having sealing means thereon for engagement with the hull of the vessel, an opening in the wall of said hopper in co-axial alignment with the said inlet opening, a tubular nipple on said hopper in registry with said co-axial opening, a rod disposed in said aligned openings and nipple and extending outwardly of said hopper at both ends of the rod, a hand nut threaded on the end of the rod which extends beyond the tubular nipple and disposed to be taken up against the end of the nipple, and means on the end of the rod which extends beyond the inlet opening of the hopper to be received within the scupper of the vessel, said means comprising a yoke on the end of the rod, a pair of jaws pivoted to the yoke by a pin and extending laterally of the rod on opposite sides of the rod, said jaws comprising arcuate segmental cam surfaces having teeth thereon, the outer ends of said jaws being disposed in rear of said pivot, a collar slidable on said rod in rear of said pivot, a pair of spreader members connected between the slidable collar and the pivoted jaws, a collar adjustably fixed on said rod by means of a set screw, and a coil spring disposed between said fixed and slidable members on said rod.

4. Apparatus according to claim 3 including an opening in the upper part of the wall of said hopper, a pipe nipple in alignment with said opening, and a cap for said nipple, said upper opening providing access to the interior of said hopper for cleaning or adjustment, and a hasp on said hopper for attachment of hoisting line or the like.

5. In combination in a scupper connector, a hopper having an inlet opening for alignment with the scupper of a vessel and having a discharge opening, an opening in the wall of said hopper in co-axial alignment with the said inlet opening, a tubular nipple on said hopper in registry with said co-axial opening, a rod disposed in said aligned openings and nipple and extending outwardly of said hopper at both ends of the rod, a hand nut threaded on the end of the rod which extends beyond the tubular nipple and disposed to be taken up against the end of the nipple, and means on the end of the rod which extends beyond the inlet opening of the hopper to be received within the scupper of the vessel, said means comprising jaw members on said rod, gripping means carried by said jaw members, and means adjustable to apply different degrees of expansive pressure to said jaw members.

6. In combination in a scupper connector, a hopper having an inlet opening for alignment with the scupper of a vessel and having a discharge opening, an opening in the wall of said hopper in co-axial alignment with the said inlet opening, a tubular nipple on said hopper in registry with said co-axial opening, a rod disposed in said aligned openings and nipple and extending outwardly of said hopper at both ends of the rod, a hand nut threaded on the end of the rod which extends beyond the tubular nipple and disposed to be taken up against the end of the nipple, and means on the end of the rod which extends beyond the inlet opening of the hopper to be received within the scupper of the vessel, said means comprising jaw members pivoted to said rod, said jaw members having gripping means thereon, and means adjustable to apply different amounts of expansive pressure to said jaw members, said means comprising a collar slidably mounted on said rod, an adjustable fixed collar mounted on the rod, a coil spring mounted on said rod between said sliding and fixed collars, and spreader members connecting said jaw members and said sliding collar for transmitting pressure from the coil spring to the jaw members, said adjustable fixed collar having releasable means for fixing it on said rod, said adjustable fixed collar when released being adapted to be adjusted to different positions along said rod to adjust the amount of expansive pressure applied to said pivoted jaw members.

7. In combination, in apparatus as defined in claim 1, said fixed member having releasable means for fixing said member on said rod, said member when released being adapted to be adjusted to different positions along said rod to adjust the amount of expansive pressure applied to said pivoted jaw means.

GEORGE PARRY.

REFERENCES CITED

The following references are of record in the file of this patent:

UNITED STATES PATENTS

| Number | Name | Date |
|---|---|---|
| 526,089 | Savill | Sept. 18, 1894 |
| 672,154 | Taylor | Apr. 16, 1901 |
| 145,432 | Lee | Dec. 9, 1873 |
| 1,572,983 | Barrier | Feb. 16, 1926 |
| 1,540,566 | Petree | June 2, 1925 |